Patented July 20, 1926.

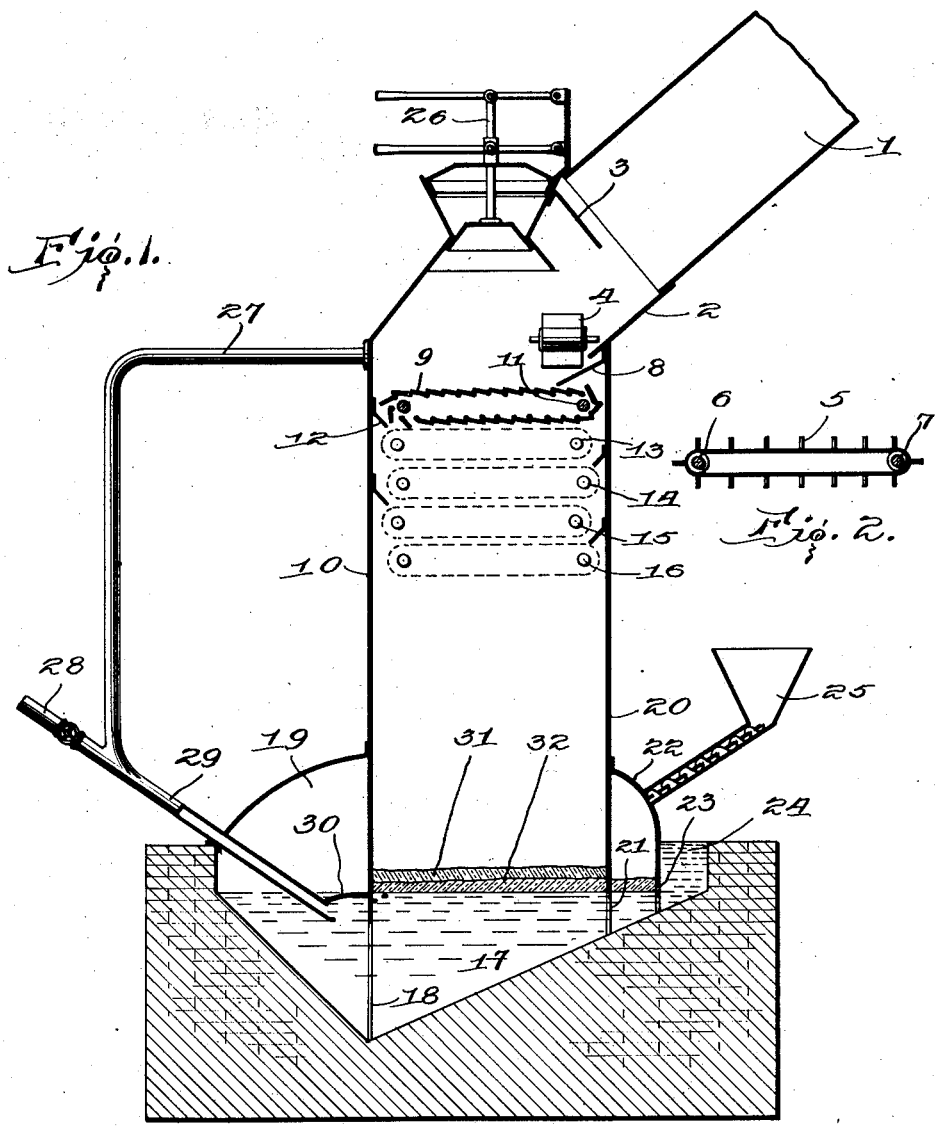

1,592,863

UNITED STATES PATENT OFFICE.

JOHANN E. LEONARZ, OF TACUBAYA, MEXICO.

METALLURGICAL PROCESS.

Application filed September 22, 1921. Serial No. 502,514.

The reduction of ores and in particular metallic oxides to the metals is generally made a continuous process. It is apparent, however, that certain ores such as the oxides of iron are susceptible of reduction in successive steps, the treatment during each step differing from that of other steps. My present invention deals with the reduction of such metallic oxides in a plurality of well defined steps.

In carrying out my process, advantage is taken of the observed transfer of heat occurring in the partial reduction and complete reduction of the oxides by CO. For example, the reduction of $Fe_2O_3$ to the metal can be carried out in two steps. In the first step the partial reduction to FeO is one in which heat is generated by the action of carbon monoxide upon the iron oxide, for instance about 160 calories for each kilogram of iron in the $Fe_2O_3$ will be set free in the reduction to FeO. Conversely, in reducing the FeO to iron there is a corresponding loss of heat amounting to approximately 154 calories. It follows that the initial partial reduction to FeO is readily carried out while the final reduction to iron is retarded by the decrease in tempreature unless this loss of heat is compensated for by further heating. This loss is materially greater in direct reduction with carbon, for instance FeO reduced to metallic iron in the presence of carbon and forming carbon monoxide will require approximately 840 calories per kilogram of iron. Viewed from the standpoint of the volume required to accomplish the indirect reduction, iron ore requires approximately twelve thousand times its volume of reducing gas for complete reduction at about 900° C. while at least one-half of this amount will be necessary to dispose of one-half of the oxygen of the ore.

Therefore the complete reduction in a continuous process requires considerable length of time, care in manipulation, and accurate control in temperature.

The second step is practically direct reduction between the carbon and metallic oxides. During this step there is formed the oxide of carbon with a corresponding increase in volume of the resulting gas. In the case of iron the temperature of the reaction will not be less than 1200° C., and the resulting gas will occupy a volume not less than ten thousand times the volume of the FeO affected. At this temperature the gas will take the form of carbon monoxide and will act mechanically to agitate all parts of the reacting materials. It is intended that this step shall be carried out in contact with molten metal and the production of these gases will give rise to an ebullition in the bath.

The upper layer of the material on top of the molten metal due to the reactions taking place will have, however, a temperature decidedly lower than the molten metal. Still the gases generated in this reaction will not fall below 900° C. and will be of sufficiently high temperature to add heat to the mineral to be reduced indirectly in the first step.

One form in which my process may be carried out is shown in the drawing, in which—

Fig. 1 shows an apparatus in sectional elevation, and

Fig. 2 shows a detail of the spreading mechanism.

The ore to be roasted is fed into the kiln 1 from which it is delivered through the conduit 2. A transverse partition 3 serves to restrict the opening from the kiln 1 to the conduit 2. A mechanical spreading device 4 operates upon the material in the conduit 2. This spreading device consists of an endless conveyer 5 driven over a pair of pulleys 6 and 7. A deflector 8 beneath the spreader 4 directs the material on to the endless grate 9. This grate extends across the area of the tower 10. Suitable rollers 11 are mounted for rotation in the tower 10, and carry the grate 9. This grate may take any form which will permit the material to rest in its travel across the tower and yet be thoroughly permeated by the gases in their upward travel between the supporting units of the grate. A deflector 12 receives the material delivered from the upper flight of the conveyer 9 and directs the material to the next successive conveyer 13. The latter carries the material across the area of the tower in a direction reverse to that of the first conveyer 9. This operation is repeated by successive conveyers 14, 15 and 16. Finally the material falls from the forward end of the lowermost grate 16 upon the surface of the molten bath 17. This molten bath of metal extends beneath tower 10, one wall of which is arched as at 18 to communicate with a furnace 19, in which the metal of the bath 17 is heated in any convenient way. The opposite wall 20 of the tower has an opening 21 at its base through which the metal and superposed slag may pass beneath a chamber 22. The chamber 22 has an outlet 23 into a trough 24 from which the slag may flow off. The chamber 22 is adapted with a feeding device 25 by which material for the production of slag may be introduced. Suitable charging apparatus 26 is formed in the upper part of the tower 10.

A return pipe 27 communicates with the top of the tower and leads to a steam injector 28. The steam injector delivers gas from the pipe 28 through pipe 29 and beneath the apron 30 whose forward lip extends under the surface of the molten bath beneath the tower 10, agitating the liquid metal and increasing its circulation. The steam entering with the gas will be converted into hydrogen and carbon monoxide by passing through or over the bath. In like manner metal oxide to be reduced may be made directly to enter the molten bath.

The roasted ore from the kiln 1 is evenly distributed over the upper flight of the grate 9. The material then travels in layers over the successive grates in the tower. The deflectors 12 prevent bypass of the reducing gases around the grates. Reducing gases rising through the tower permeate the layers of ore and accomplish an initial partial reduction during which substantially one-half of the oxygen of the ore is carried away. The fresh reducing gas comes into contact with the ore which has already been somewhat reduced. There is therefore considerable reduction accomplished at this point. As the gas rises through the layer of material it becomes depleted so that the fresh ore in the upper layer is brought into contact with the least vigorous reducing gas. In this way the full reducing power of the gas is made available.

It is intended that the spent gases leaving the upper layer of ore shall pass out through the material in the kiln 1 where they may deliver their heat to the latter and may be burned off. Further heat may also be introduced into kiln 1.

A portion of the spent gas may be withdrawn through the conduit 27 and regenerated by passage through the molten bath 17 in the presence of the carbon in the bath. The injector 28 may be used to propel the spent gas into the molten bath 17 as well as to introduce steam or carbonaceous material to support the reaction. The partially reduced material from the lowermost grate falls upon the surface of the molten bath near the lip 30. The heating of the bath from the furnace 19 as well as the introduction of gas or material through the pipe 29 serves to maintain a circulation in the bath from the lip 30 towards the opposite side wall. This distributes the partially reduced oxide and its accompanying carbonaceous material into an even layer 31. As the material comes into contact with the molten bath there is the production of a thin layer of slag 32 which extends over into the chamber 22 and after being made more liquid by the addition of slagging material from the charging device 25 is ultimately drawn off from the trough 24.

The second step of reduction takes place in the layer of materials 31 as the latter come into contact with the molten bath. The carbon in and above the molten bath reacts directly with the partially reduced oxides upon the surface of the bath and also upon the metallic oxides which may be carried in the slag. There is a consequent reduction to the metal with accompanying production of carbonic oxide. Due to the temperature of the bath and the rapid production of the gaseous oxides of carbon there is an ebullition which brings all parts of the bed of material 31 and slag 32 into intimate contact with the carbon and reducing gases.

In carrying out my process, it will be evident that the above description shows one of numerous forms which the process may take and it is to be understood that various changes may be made in minor details without departing from the scope of the invention as claimed.

What I claim is:

The process of obtaining metal from ore which includes partially reducing the ore by contact with reducing gas, then bringing the resulting material and carbon in contact with a bath of the molten metal, regenerating the gas from the first-named step by passing it through the bath and then utilizing it in the said reducing step.

In testimony whereof, I have hereunto affixed my signature.

JOHANN E. LEONARZ.